United States Patent

Billias et al.

[15] 3,645,816
[45] Feb. 29, 1972

[54] METHOD FOR SEALING LEAKS IN FLUID TANKS

[72] Inventors: Michael G. Billias, Decatur; Robert L. Floyd, Jr., Norcross, both of Ga.

[73] Assignee: Lockheed Aircraft Corporation, Burbank, Calif.

[22] Filed: July 14, 1969

[21] Appl. No.: 841,389

[52] U.S. Cl. ............................................... 156/94, 156/91
[51] Int. Cl. .............................................................. B32b 35/00
[58] Field of Search ............... 156/94, 500; 138/97, 98, 99; 161/54; 137/384; 85/35, 37, 1 JP, 1; 287/189.36

[56] References Cited

UNITED STATES PATENTS

| | | | |
|---|---|---|---|
| 2,710,113 | 6/1955 | Prichard | 189/36 X |
| 3,022,870 | 2/1962 | John et al. | 161/54 |
| 1,867,736 | 7/1932 | Finkeldey | 85/37 |
| 2,458,032 | 1/1949 | Simon et al. | 156/94 |
| 2,622,468 | 12/1952 | Mattio | 85/37 |
| 2,681,877 | 6/1954 | Seymour | 156/94 |
| 2,855,338 | 10/1958 | Mulkey | 156/94 |
| 3,381,340 | 5/1968 | Chapin et al. | 156/500 |

Primary Examiner—Benjamin A. Borchelt
Assistant Examiner—Daniel Bent
Attorney—James A. Hinkle and George C. Sullivan

[57] ABSTRACT

A method and apparatus for effecting permanent external repairs of fluid leaks generally around fasteners in a rigid hollow articles such as aircraft integral fuel tank leaks by placing over the leaking fastener a metallic foil preformed patch having the same configuration as the protruding portion of the fastener and coated with a polysulfide sealant, or other types of rapid cure sealants, and then curing the sealant preferably by the application of heat to the localized area by a heating tool having interchangeable tips for mating engagement with the particular preformed foil patch.

10 Claims, 4 Drawing Figures

INVENTORS.
MICHAEL G. BILLIAS
ROBERT L. FLOYD, JR.

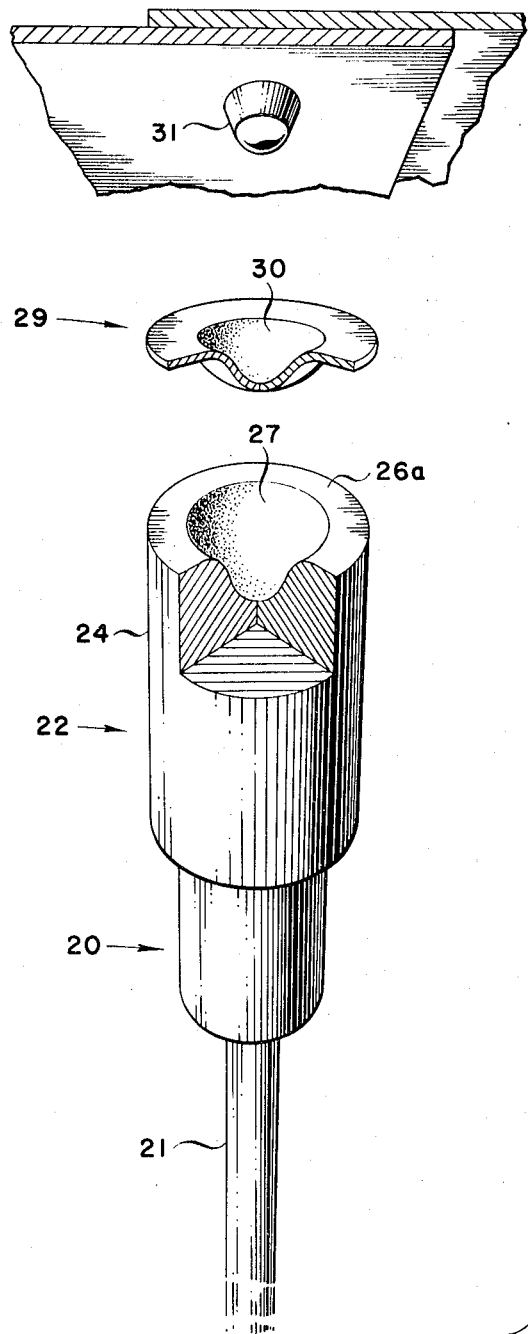
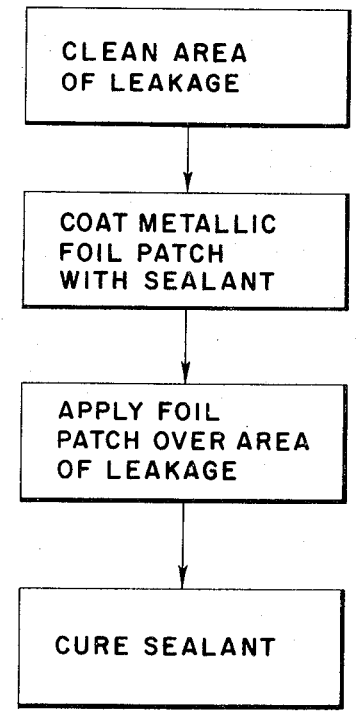
Fig. 3
Fig. 4
INVENTORS.
MICHAEL G. BILLIAS
ROBERT L. FLOYD, JR.

METHOD FOR SEALING LEAKS IN FLUID TANKS

This invention pertains in general to the repair of rigid hollow articles having fluid leaks therein and to specific apparatus for accomplishing the repair, and in particular to the repair of leaking fasteners in integral fuel tanks of aircraft and like articles.

In modern aircraft it has been found that a tremendous amount of design effort and aircraft weight can be saved with the provision of integral fuel tanks in the aircraft. Integral fuel tank designs are advanced concepts in that they provide maximum fuel carrying capabilities at minimum weight. These designs have also been refined to a point so as to minimize leak paths. In the construction of integral fuel tanks, sealants are used in all the faying surfaces of all joints and all the fasteners are normally wet installed with sealant. Thus, the sealant is applied in areas where it is protected and most effective. However, with all of this careful manufacturing procedure, leaks still occur in the integral fuel tanks.

The reason that leaks occur is that the number of possible leak sources is virtually infinite since each fastener requires a fastener hole which provides a possible leak path. For instance, in the Military C-141 aircraft the integral fuel tanks contain approximately 70,000 fastener holes, thus providing a large number of possible leak paths. Consequently, even if fabrication conditions are perfect, leaks still occur because sealing materials are elastic rubberlike materials and cannot be expected to function in the manner which stiffer structural materials function. If a fastener or a joint becomes loose due to abnormal flight loads, hard landings or for any other reason, the fastener or the joint may develop a leak. The sealant will not and cannot hold the joint together by itself. Also, it is well known that corrosion around fasteners and other parts can cause fuel leaks.

In the past, in order to stop a fuel leak, one common practice in fuel repair was to add plenty of fresh sealant to the general area within the fuel tank from which this leak was felt to originate. This, however, resulted in an excessive buildup of sealant. Eventually, this sealant buildup had to be removed to locate sources of subsequent leaks because addition of even more sealant did not always stop the leaks.

When the addition of the large mass of sealant did not completely stop a fuel leak, it was necessary in the past to completely deseal the fuel tank. One particular method for removing sealant within the fuel tank was the "deseal then reseal" method which involved means for circulating a chemical for either dissolving the sealant or removing its bond within the fuel tank until all of the sealant is completely removed and then the fuel tank is drained and dried, after which sealant is reapplied to all necessary surfaces. Obviously, such a procedure is expensive at best and has proved to be only marginally effective since it continuously exposes the tank structure to the chemicals which will have a tendency to remove sealant from within the faying surfaces and fastener joints. This obviously, is not needed or wanted.

Yet another type of repair in the prior art called for injection of sealant into the area from which the leak was thought to originate. However, such a procedure called for the use of very expensive and specialized injection tools which have proved to be not wholly satisfactory due mainly to their cost, complexity and the inability to repeatedly inject sufficient quantities of sealant into the leak paths.

Consequently, an object of this invention is the provision of method and apparatus for effecting external permanent repairs to fuel tanks and other rigid hollow articles containing fluids so that the repairs will eliminate not only the leak but obviate the necessity for prior art sealing practices which have not proved completely successful. A leak in an aircraft can be repaired by the present invention in a matter of minutes whereas by previous methods the repair time was, at times, measured in days. The present invention also provides method and apparatus for effecting the desired repair at a nominal cost, and the repair is considered permanent.

Other objects, advantages and capabilities of the invention will become apparent from the following description taken in conjunction with the accompanying drawings showing a preferred embodiment of the invention.

In the drawings:

FIG. 3 is a representative of a tip for a heating means utilized with protruding head fasteners and illustrating a patch for use with such fasteners; and FIG. 4 is a block diagram showing the generalized steps utilized in the method of the present invention.

Figure 1:
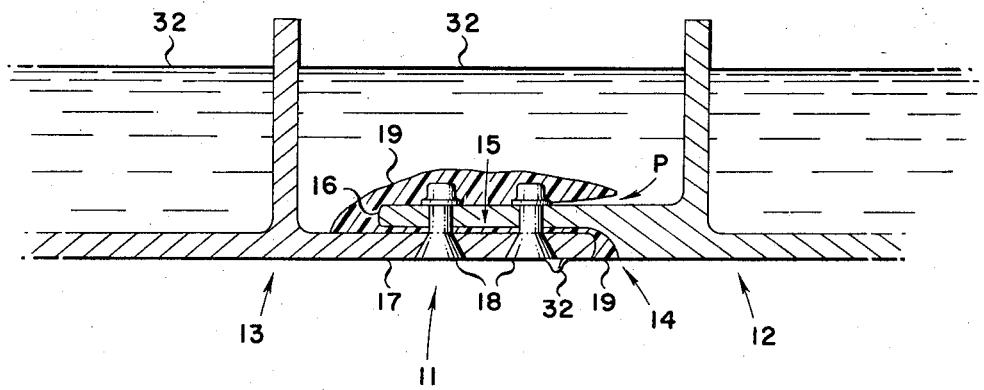
FIG. 1 is a vertical section view through an aircraft wing having an integral fuel tank therein and showing a probable leak path for fuel to the exterior of the wing.

Referring now to the drawings wherein like reference characters designate corresponding parts throughout the several figures, numeral 11 indicates a common type of aircraft wing which houses an integral fuel tank. In the typical modern aircraft the wing structure is frequently made up of joined extruded wing planks 12 and 13 which are joined together along joint line 14 which indicates the beginning of faying surface 15.

Figure 2:
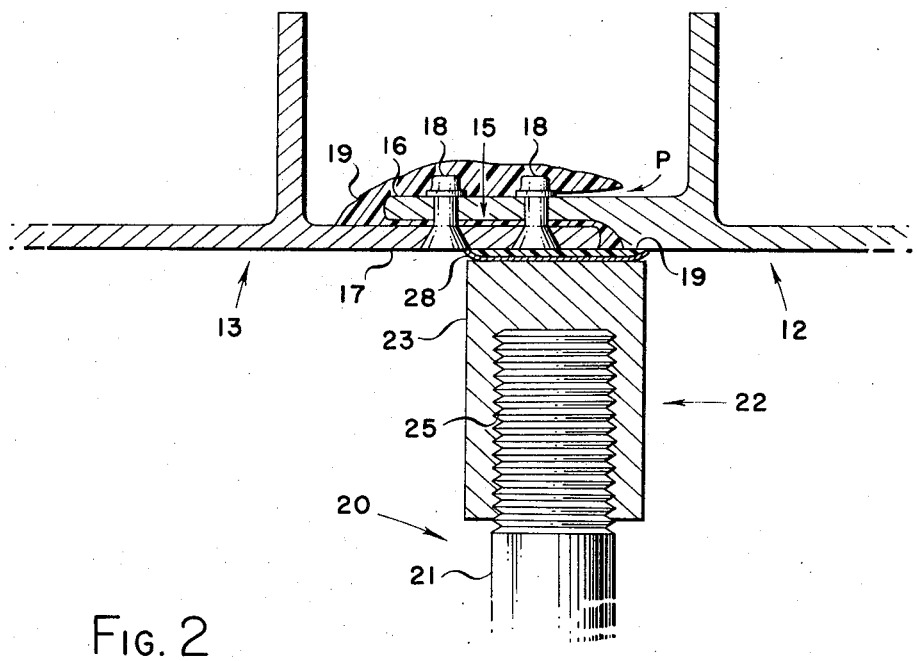
FIG. 2 is a vertical section view similar to that of FIG. 1 showing a repair patch in place over a leaking fastener and illustrating a patch applying tool and a heating means for effecting heat curing of the sealant utilized in the invention.

As can be seen from FIGS. 1 and 2, the wing planks 12 and 13 have respective overlapping edges 16 and 17 which, when matingly engaged, form the faying surface 15. Holding the overlapping edges together and forming a unitary structure for the wing planks are the plurality of fasteners 18 which are normally installed in a "wet" condition which means that a supply of sealant is placed within the fastener hole before the fastener is installed, and when the fastener is drawn up tight, the sealant completely fills any voids between the fastener and the members which the fasteners are joining. In addition, normal procedures dictate that the faying surface and other joints be also sealed in a like manner not only to provide a leakproof fuel tank but to inhibit the progress of corrosion. However, even with the safeguards incorporated into modern aircraft, it is quite frequent that because of the tremendous stresses put upon the aircraft, the fasteners at certain points, especially in stress points, may become loosened or otherwise develop conditions which allow leakage of fuel around the fastener to the exterior of the fuel tank.

Leak detection is normally a very simple matter since it can be done visually by the technician. However, such detection is an extremely important operation. Timely detection and classification of leaks are vital. An undetected fuel leak can be the cause of an aircraft accident that can result in loss of life, loss of the aircraft or loss of mission capability. Fuel tanks must be monitored constantly for fuel leaks. Fuel leaks are normally classified to determine the severity and the remedial action anywhere from a condition of a slow seep to a running leak. Obviously, a running leak is a severe condition and needs to be repaired immediately. Once a leak has been located, the next step is to make the repair either by repairing a loose joint or fastener or to effect the external repair as proposed herein. Of course, any joint that is loose or has a defective fastener will require a structural repair before a permanent seal can be obtained. Common aircraft manufacturing procedures now call for the fasteners 18 and the faying joints 15 to be installed with a coating of known polysulfide sealant as indicated by numeral 19. While it has been found that certain polysulfide sealants are preferred for use in this invention, this should not be taken as to preclude the use of flurosilicone, flurocarbon or polyurethane sealants which are fuel resistant.

The method as set forth in the present invention will necessarily include, as a preliminary step, the locating of a local fluid permeable discontinuity in the article through which the fluid is leaking. A leak path P is indicated in FIGS. 1 and 2 between sealant 19 and edge 16 which allows fuel 32 access to a rivet 18 and possible exterior egress. Once the area of leaking has been discovered and pinpointed, the generalized method of effecting the repair would be to first wipe clean the area so as to leave a clean, dry surface to which the sealant will adhere. To promote a good adherence between the sealant and wing surface, the fuel should preferably be drained from the tank so that the surface to which the patch is to adhere will be maintained in a dry condition until the sealant cures. However, it is not necessary that the tank be drained since even in a "running leak" condition the patch can be prepared, the surface cleaned and wiped dry, and then the patch can be placed immediately over the leaky fastener. In this situation the uncured sealant will stop the leak from progressing until the sealant cures. Should there be any organic finishes around the leaking fastener or other area, these finishes should be removed with methyl ethyl ketone. Should the organic finish be of such a type that it cannot be removed easily with the methyl ethyl ketone, then the repair may be effected directly over the finish after a light sanding to break the surface gloss of the finish. After cleaning, a repair patch is selected which will fit over the fastener or other area to be repaired, and assuming the leak is coming from a common type of aircraft fastener, the patch will normally be of a diameter which measures 1 to 1½ inches. In any event, the patch should assure a ¼-inch minimum bond distance around the fastener after application in order to make sure that the entire leaking area has been covered.

It has been found that aluminum foil of between 0.003 inch and 0.006 inch in thickness is quite satisfactory in actual operation to perform the repair. If the patch is to be applied over a flush head fastener, the selection should be made from a supply of patches which are completely of planar configuration. Once the patch is selected, polysulfide sealant, meeting the requirements of Mil-S-8802, Class B, should be applied to the patch in a thickness of approximately 0.015 to 0.020 inch. The patch should then be applied to the area adjacent to and over the discontinuity with mild pressure to insure complete adhesion and filling of all imperfections and voids with the sealant. Generally, the last step of the repair procedure is the curing of the sealant.

The curing operation of the polysulfide or other type of sealant may be one in which the sealant is allowed to cure naturally without any additional steps to promote faster curing. However, it has been found that the application of heat to the sealant will appreciably speed up the curing rate. With Mil-S-802 Class B-½ polysulfide sealant, heat may be applied to the localized area of the patch and sealant at approximately a temperature of 150° F. At this temperature the polysulfide sealant would cure sufficiently to effect the repair in about 30 minutes. As an alternative, polysulfide sealant Mil-S-802, Class B-¼ will suffice as an alternate should the cure time need to be shortened. With the latter sealant, the cure time is approximately 15 minutes. However, certain disadvantages attach to the latter sealant in that its application time is very short, and frequently, there is not sufficient time to properly mix the sealant, apply it to the patch and get the patch positioned over the desired fastener before the sealant has started to cure. The criticality of the temperature range for effecting curing of the sealant is not particularly critical on the low side of the 150° range since the sealant will cure at room temperature even though at a much slower rate. However, any temperature substantially above 150° will be detrimental to the composition of the sealant since it will cause a sponging effect and allow voids to form within the sealant which obviously will not allow a proper seal of the leaking fastener. Therefore, curing temperatures of more than about 150° to 160° F. should be avoided. A controlled temperature soldering iron has been found to be sufficient to effect rapid curing of the sealant if the temperature is controlled between 140° and 150° F.

A typical controlled temperature soldering iron is shown in FIg. 3 by the numeral 20. The soldering iron has a handle 21, a heating element (not shown) of controlled temperature design and a heat applicator tip 22. As shown in FIGS. 2 and 3, the heat applicator tip may be of several designs. However, it has been found that two or three separate designs will fit most applications. In FIG. 2, there is shown a tip 23 for the soldering iron which is generally cylindrical in shape with a flat face and having a hollow internal threaded portion 25 which is matingly engaged with the threaded shank of the handle 21 containing the heating element. However, it is recognized that there is no particular need for the threaded portion, the only requirement being that good heat transfer properties be designed into the tip and the soldering iron. The diameter of any tip 22 should be of a size which will enable the soldering iron to completely cover the foil patch which is being utilized at the time the repair is being made. This will ensure that the correct amount of localized heat will be distributed over the entire patch. The applicator tip 23 shown in FIG. 2 has a flat planar heat application surface 26 for use with flush head fasteners on the fuel tank.

As an alternative to flush head application tip 23, there is shown in FIG. 3 applicator tip 24 of cylindrical configuration with a threaded hollow interior portion which, in all intents and purposes, is identical to tip 23. However, in one important difference, the heat application surface 26a has a dimpled recess 27 which is designed to be of such configuration and size as to fit over protruding head fasteners. With the use of this tip, a metallic foil patch may be flat and of planar configuration. With a flat patch 28 having the required coating of sealant and positioned over the leak, pressure upon the soldering iron through the tip 24 would conveniently form the patch to the shape of the protruding head fastener as the fastener is received into the recess 27. While such a procedure is entirely satisfactory, if properly performed, it has been found that a preformed patch 29 having a preformed pocket 30 to receive the protruding head fastener 31 is quite satisfactory and will prevent any tearing problems that might attend a flat patch being placed over a protruding head fastener. Such a preformed patch would be applied to the fastener in the same manner as described for the flat patch, with the additional care being taken that sufficient sealant is put into the preformed pocket 30 of the patch to eliminate the possibility of voids being present in the completed patch.

EXAMPLE

A test fuel tank was constructed utilizing test panels having a plurality of fasteners installed therein in a manner which simulated actual leaks in an aircraft fuel tank. In order to simulate an actual fuel leak, a small cold chisel was utilized to deform the aluminum skin at the fastener location to create a slot. After the uniform slots were made and the fasteners installed with a wet sealant in the normal required manufacturing procedure, pressurized air was used to blow the sealant out of the slot. The sealant was then allowed to cure and the panels were checked for leaks. Most of the leaks created in this manner in the test panels were running leaks. The leaks were then repaired using the materials, tools and procedures as follows.

After the test tank was filled with JP-4 jet fuel to check the leak, and for the purposes of the test to approximate severe field problems, the fuel was left in the tank for the entire test program to prove the patching technique could be conducted in a "wet" environment. The test apparatus was designed to provide static pressures as well as dynamic or cycled pressures from 0 to 12 p.s.i.g. at a rate of 15 cycles per minute and in three different temperature environments of $-63°\pm5°$ F., room temperature and $140°\pm10°$ F.

In performing the repair, an aluminum metallic foil patch was selected having a thickness of 0.003 inch and sized so that at least one-fourth inch of the patch extended entirely around and overlapped the area of leakage around the fastener. The area around the fastener was cleaned with methyl ethyl ketone and clean rags. The metallic foil patch was then coated with 0.015 to 0.020 inch of Mil-S-8802, Class B-½ polysulfide sealant and placed over the fastener with mild hand pressure.

Utilizing a heating tool equivalent to tool 20 and a flush head applicator tip 23, the sealant under the foil patch was then heat cured by holding the heating means in place over the patch and supplying the patch with curing temperatures of approximately 150° F. for approximately 30 minutes. After the patch and sealant had sufficiently cured to effect the repair, the repairs were then tested and each test panel was subjected to a leak test comprising a fuel tank full of fuel with 0 p.s.i.g. applied pressure. The second static test utilized a test tank full of fuel with applied pressure in the tank being increased in 1 p.s.i.g. increments from 1–12 p.s.i.g. and held at each pressure for a minimum of 1 minute. The third test included 0–12 p.s.i.g. applied pressure for dynamic cycling with the test tank full of fuel. The patches applied according to the present method were subjected to 11 dynamic cycles in the test fuel tank containing a full measure of fuel, and each dynamic cycle consisted of 1,000 cycles at 0–12 p.s.i.g. at room temperature, 1,000 cycles at 0–12 p.s.i.g. at 140°±10° F. and 1,000 cycles at 0–12 p.s.i.g. at −63°±5° F.

In the subject test panel of the instant test, eight fasteners were installed that were flush head fasteners while eight of the installed fasteners were of the protruding head type. After the static pressure testing was completed, no fastener was found to be leaking, and after the dynamic testing was completed, it was found that none of the fasteners installed in accordance with this invention were leaking after 11 dynamic cyclings in the three temperature environments. Accordingly, it was determined that this test constituted a permanent repair procedure.

What is claimed is:

1. A method of externally repairing a rigid hollow article having a local fluid permeable discontinuity therein comprising the steps of; cleaning the external area of the article adjacent the discontinuity, applying a metallic foil patch to the area adjacent to and over the discontinuity with a layer of adhesive sealant between the patch and the article, and allowing the adhesive sealant to cure to thereby constitute a metallic foil reinforced body impermeable at the discontinuity to fluid under pressure and to enclose the discontinuity by the secure adherence of the foil patch to the article.

2. The method defined in claim 1 comprising the additional step of coating the area adjacent to and over the discontinuity with the adhesive sealant.

3. The method defined in claim 1 comprising the additional step of coating the metallic foil patch with the adhesive sealant.

4. The method defined in claim 1 in which the adhesive sealant is a mixture consisting essentially of polysulfide material.

5. The method defined in claim 1 comprising the additional step of curing the sealant with locally applied heat.

6. The method defined in claim 5 comprising the additional step of placing a heating means in direct physical contact with the foil patch to thereby heat cure the sealant.

7. The method defined in claim 6 comprising the additional step of providing the heating means with a heat transfer surface having a configuration that substantially duplicates the patch configuration over the discontinuity.

8. The method defined in claim 6 comprising the additional step of curing the sealant at a temperature not exceeding about 155° F. wherein the sealant is a mixture consisting essentially of polysulfide material.

9. A method of externally repairing a fluid permeable discontinuity in a rigid metallic wall of a hollow article, comprising the steps of:
   cleaning the external area of the metallic wall adjacent the discontinuity;
   applying a metallic foil patch to the area adjacent to and over the discontinuity in the metallic wall with a layer of adhesive sealant between the patch and the article; and
   allowing the adhesive sealant to cure to thereby constitute a metallic foil reinforced body impermeable at the discontinuity to fluid under pressure and to enclose the discontinuity by the secure adherence of the foil patch to the metallic wall of the article.

10. The method of claim 9, comprising the additional step of curing the sealant with heat locally applied by placing a heating means in direct physical contact with the foil patch to thereby heat cure the sealant.

* * * * *